(12) United States Patent
Kimura et al.

(10) Patent No.: US 6,534,594 B1
(45) Date of Patent: Mar. 18, 2003

(54) ELASTOMER COMPOSITION AND THERMOPLASTIC RESIN COMPOSITION CONTAINING THE SAME

(75) Inventors: Katsuhiko Kimura, Akashi (JP); Taizo Aoyama, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/831,923

(22) PCT Filed: Nov. 30, 1999

(86) PCT No.: PCT/JP99/06672

§ 371 (c)(1),
(2), (4) Date: May 29, 2001

(87) PCT Pub. No.: WO00/32690

PCT Pub. Date: Jun. 8, 2000

(30) Foreign Application Priority Data

Dec. 3, 1998 (JP) ............................................ 10-344601

(51) Int. Cl.$^7$ ............................................... C08L 83/80
(52) U.S. Cl. ...................... 525/100; 525/102; 525/431; 525/446; 524/268; 528/26; 528/42
(58) Field of Search ..................... 528/26, 42; 525/100, 525/102, 431, 446; 524/268

(56) References Cited

U.S. PATENT DOCUMENTS 5,057,619 A * 10/1991 Kumar et al.
5,523,373 A * 6/1996 Esselborn et al.

FOREIGN PATENT DOCUMENTS

| EP | 575 809 A2 | * | 12/1993 | |
|----|------------|---|---------|---|
| EP | 0 575 809 A2 | | 12/1993 | |
| JP | 2-47152 | | 2/1990 | |
| JP | 03185043 A | * | 8/1991 | |
| JP | 7-216171 | | 8/1995 | |
| JP | 09302242 A | * | 11/1997 | |
| JP | 9-302242 | | 11/1997 | |
| JP | 2000264936 A | * | 9/2000 | ......... C08F/285/00 |
| WO | WO 90/02156 | | 3/1990 | |

* cited by examiner

Primary Examiner—Robert Dawson
Assistant Examiner—Marc S Zimmer
(74) Attorney, Agent, or Firm—Armstrong, Westerman & Hattori, LLP

(57) ABSTRACT

There is provided an elastomer composition for an impact modifier and a thermoplastic resin composition having improved impact resistance using the same. An elastomer composition comprises a block copolymer (a) containing a methacrylate polymer and a siloxane polymer, and a graft copolymer (b) containing a polymer component having a glass transition temperature of lower than 25° C. And the composition is mixed with a thermoplastic resin (c).

20 Claims, No Drawings

ELASTOMER COMPOSITION AND THERMOPLASTIC RESIN COMPOSITION CONTAINING THE SAME

TECHNICAL FIELD

The present invention relates to an elastomer composition useful as an impact modifier and a thermoplastic resin composition excellent in impact resistance. More specifically, the invention relates to an elastomer composition comprising (a) a block copolymer containing a methacrylate polymer and a siloxane polymer and (b) a graft copolymer containing a polymer component whose glass transition temperature is lower than 25° C. and a polymer component whose glass transition temperature is at least 25° C., and to a thermoplastic resin composition comprising the elastomer composition and (c) a thermoplastic resin.

BACKGROUND ART

Generally, thermoplastic resins are used in various fields and attempts are made regarding methods of use in combination with other resins and the like when sufficient performance cannot be achieved by the uniform resin. Particularly, a polymer material with elastomer characteristics is used in combination therewith in most cases for improving impact resistance. The polymer material used for such purposes is referred to as an impact modifier.

There are proposed compositions obtained by combining, for example, a vinyl chloride resin with chlorinated polyethylene, ethylene-vinyl acetate copolymer, methyl methacrylate-butadiene-styrene copolymer (hereinafter referred to as MBS resin) acrylonitrile-butadiene-styrene copolymer (hereinafter referred to as ABS resin), butyl acrylate-methyl methacrylate copolymer or the like; a methacrylate resin with butyl acrylate-styrene-methyl methacrylate copolymer or the like; a polycarbonate resin with ABS resin, butyl acrylate-methyl methacrylate copolymer or the like; a poly(butylene terephthalate) resin with ABS resin, epoxy modified ethylene-propylene copolymer or the like, and many of these compositions are for industrial use. Among these impact modifiers, MBS resin, ABS resin and butyl acrylate-methyl methacrylate copolymer are copolymers obtained by graft copolymerizing a vinyl monomer (forming a shell) in the presence of cross-linked rubber particles (forming a core), which are called a core-shell graft copolymer based on the particle structure, and useful as an impact modifier. MBS resin and ABS resin obtained by copolymerizing butadiene have a problem with weatherability among these core-shell graft copolymers, because unsaturated double bond remains in the main chain of the polymer. Therefore, butyl acrylate-methyl methacrylate copolymer is selected very frequently when weatherability is required. It is pointed out, however, that these core-shell graft copolymers have problems with molding flowability because of the cross-linked structure though they are useful as an impact modifier.

Also it is known that a block copolymer obtained by combining a hard segment and a soft segment (rubber component) can be used by combining them with a thermoplastic resin. Examples of these block copolymers are styrene-butadiene copolymers, styrene-isoprene copolymers and hydrogenated copolymers thereof (referred to as a styrene-ethylene-butylene copolymer and a styrene-ethylene-propylene copolymer, respectively) and they are widely used. Generally, use of these block copolymers enables to obtain a composition having excellent balance in impact resistance, rigidity and molding flowability, but limits the kinds of combined thermoplastic resins to low polarity resins such as polystyrene resins, polyolefin resins and poly(phenylene ether) resins.

An object of the present invention is to provide an elastomer composition useful as an impact modifier and a thermoplastic resin composition having improved impact resistance.

DISCLOSURE OF INVENTION

The present invention was completed based on the findings by the inventors that an elastomer composition comprising (a) a block copolymer containing a methacrylate polymer and a siloxane polymer, and (b) a graft copolymer containing a polymer component whose glass transition temperature is lower than 25° C. and a polymer component whose glass transition temperature is at least 25° C., functions as an excellent impact modifier, surprisingly showing a higher improvement effect on impact resistance than when (a) or (b) is used alone, and that combination of the elastomer composition and a thermoplastic resin (c) leads to a thermoplastic resin composition excellent in impact resistance.

That is, the present invention relates to an elastomer composition comprising (a) a block copolymer containing a methacrylate polymer and a siloxane polymer and (b) a graft copolymer containing a polymer component whose glass transition temperature is lower than 25° C. and a polymer component whose glass transition temperature is at least 25° C.

The present invention also relates to a thermoplastic resin composition comprising the elastomer composition and (c) a thermoplastic resin.

BEST MODE FOR CARRYING OUT THE INVENTION

The block copolymer (a) useful in the present invention is a block copolymer having at least one of (A) a methacrylate polymer containing a methacrylic monomer as a main component and at least one of (B) a siloxane polymer containing a siloxane monomer as a main component, respectively. The component (A) functions to improve dispersability and interface adhesion with the thermoplastic resin, while the component (B) functions to improve impact resistance.

The above block copolymer (a) is at least one block copolymer selected from the group consisting of A-B type di-block copolymer, A-B-A type tri-block copolymer, B-A-B type tri-block copolymer and $(A-B)_n$ type multi-block copolymer. Among them, the A-B di-block copolymer, the A-B-A tri-block copolymer and a mixture thereof are preferable from the viewpoint of impact resistance.

The structure of the above block copolymer (a) may be linear, branched (star-shaped) or a mixed structure thereof. The structures of these block copolymer may be selected and used properly depending on necessary characteristics including processability or mechanical properties of the thermoplastic resin composition.

The number average molecular weight of the block copolymer (a) is not particularly limited, and is usually 30,000 to 500,000, preferably 50,000 to 400,000. It can be determined according to the processability required, since a small number average molecular weight tends to cause low viscosity and large number average molecular weight high viscosity.

The ratio of weight average molecular weight (Mw) to number average molecular weight (Mn) measured by gel permeation chromatography is not particularly limited, and is preferably at most 1.8, more preferably at most 1.5. When Mw/Mn is larger than 1.8, uniformity of the block copolymer tends to decrease.

The composition ratio of the methacrylic polymer block (A) and the siloxane polymer block (B) constituting the above block copolymer (a) is preferably 5 to 90% by weight of component (A) and 95 to 10% by weight of component (B), more preferably 10 to 80% by weight of component (A) and 90 to 20% by weight of component (B) and most preferably 20 to 50% by weight of component (A) and 80 to 50% by weight of component (B). When the component (A) is less than 5% by weight, compatibility with the thermoplastic resin tends to decrease. When the component (B) is less than 10% by weight, impact resistance of the thermoplastic resin tends to decrease. In order to impart transparency to the thermoplastic resin composition, the ratio of the component (A) and (B) may be selected in such a way that the refraction index of the block copolymer matches the refraction index of the thermoplastic resin to be combined.

The methacrylic polymer block (A) which constitutes the block copolymer (a) is a block obtained by polymerizing a monomer having a methacrylate ester as a main component, and a vinyl monomer copolymerizable therewith may be copolymerized within the range in which properties of the methacrylate ester polymer are not lost for the purpose of adjusting refraction index, glass transition temperature, compatibility with the thermoplastic resin and the like. The methacrylic polymer block (A) comprises, preferably, 50 to 100% by weight of methacrylate ester and 0 to 50% by weight of a vinyl monomer copolymerizable therewith, more preferably 50 to 99.9% by weight of methacrylate ester and 0.1 to 50% by weight of a vinyl monomer copolymerizable therewith. When the amount of the methacrylate ester is less than 50%, the glass transition temperature and the compatibility with the thermoplastic resin inherent to the methacrylate ester tend to be lost.

Examples of the methacrylate ester which constitutes the component (A) include methyl methacrylate, ethyl methacrylate, n-propyl methacrylate, iso-propyl methacrylate, n-butyl methacrylate, iso-buthyl methacrylate, tert-butyl methacrylate, n-pentyl methacrylate, n-hexyl methacrylate, cyclohexyl methacrylate, n-heptyl methacrylate, n-octyl methacrylate, 2-ethylhexyl methacrylate, nonyl methacrylate, decyl methacrylate, dodecyl methacrylate, phenyl methacrylate, toluyl methacrylate, benzyl methacrylate, isobornyl methacrylate, 2-methoxyethyl methacrylate, 3-methoxybutyl methacrylate, 2-hydroxyethyl methacrylate, 2-hydroxypropyl methacrylate, stearyl methacrylate, glycidyl methacrylate, 2-aminoethyl methacrylate, γ-(methacryloyloxypropyl) trimethoxysilane, γ-(methacryloyloxypropyl) dimethoxymethylsilane, ethylene oxide adduct of methacrylic acid, trifluoromethylmethyl methacrylate, 2-trifluoromethylethyl methacrylate, 2-perfluoroethylethyl methacrylate, 2-perfluoroethyl-2-perfulorobutylethyl methacrylate, 2-perfluoroethyl methacrylate, perfluoromethyl methacrylate, diperfluoromethylmethyl methacrylate, 2-perfluoromethyl-2-perfuloroetylmethyl methacrylate, 2-perfluorohexylethyl methacrylate, 2-perfluorodecylethyl methacrylate, 2-perfluorohexadecylethyl methacrylate and the like. These can be used alone or in combination of two or more. Among these, methyl methacrylate is preferable from the viewpoints of compatibility with thermoplastic resins to be combined with and easy availability.

Examples of the vinyl monomer copolymerizable with the methacrylate ester which constitutes the component (A) include an acrylicate ester such as methyl acrylate, ethyl acrylate, n-propyl acrylate, iso-propyl acrylate, n-butyl acrylate, iso-butyl acrylate, tert-butyl acrylate, n-pentyl acrylate, n-hexyl acrylate, cyclohexyl acrylate, n-heptyl acrylate, n-octyl acrylate, 2-ethyl hexyl acrylate, nonyl acrylate, decyl acrylate, dodecyl acrylate, phenyl acrylate, toluyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2-aminoethyl acrylate, γ-(methacryloyloxypropyl) trimethoxysilane, γ-(methacryloyloxypropyl) dimethoxymethylsilane, ethylene oxide adduct of acrylic acid, trifluoromethylmethyl acrylate, 2-trifluoromethylethyl acrylate, 2-perfluoroethylethyl acrylate, 2-perfluoroethyl-2-perfulorobutylethyl acrylate, 2-perfluoroethyl acrylate, perfluoromethyl acrylate, diperfluoromethylmethyl acrylate, 2-perfluoromethyl-2-perfuloroetylmethyl acrylate, 2-perfluorohexylethyl acrylate, 2-perfluorodecylethyl acrylate or 2-perfluorohexadecylethyl acrylate; an aromatic alkenyl compound such as styrene, α-methyl styrene, p-methyl styrene, p-methoxyl styrene; a vinyl cyanide compound such as acrylonitrile or methacrylonitrile; a conjugated diene compound such as butadiene or isoprene; a halogen-containing unsaturated compound such as vinyl chloride, vinylidene chloride, perfluoroethylene, perfluoropropylene or vinylidene fluoride; a silicon-containing unsaturated compound such as vinyl trimethoxysilane or vinyl triethoxysilane; an unsaturated dicarbonate compound such as maleic anhydride, maleic acid, monoalkyl ester and dialkyl ester of maleic acid, fumaric acid, monoalkyl ester and dialkyl ester of fumaric acid; a vinyl ester compound such as vinyl acetate, vinyl propionate, vinyl pivalate, vinyl beozoate or vinyl cinnamate; a maleimide compound such as maleimide, methyl maleimide, ethyl maleimide, propyl maleimide, butyl maleimide, hexyl maleimide, octyl maleimide, dodecyl maleimide, stearyl maleimide, phenyl maleimide or cyclohexyl maleimide. These are used alone or in combination of two or more. A preferable vinyl monomer can be selected out of these according to its compatibility with the thermoplastic resins. In order to impart transparency to the thermoplastic resin composition, the vinyl monomer may be selected in such a way that the refraction index of the block copolymer matches the refraction index of the thermoplastic resin to be combined.

Among these, acrylate ester, mathacrylate ester, an aromatic alkenyl compound, a vinyl cyanide compound, a conjugated diene compound and a halogen-containing unsaturated compound are preferable from the viewpoint of industrial availability.

The glass transition temperature of the component (A) is preferably at least 25° C., more preferably at least 40° C., and most preferably at least 50° C. When the glass transition temperature is lower than 25° C., impact resistance of the thermoplastic resin tends to decrease.

The siloxane polymer (B) which constitutes the above block copolymer (a) is a polymer having a structure comprising repeating units represented by the general formula (1):

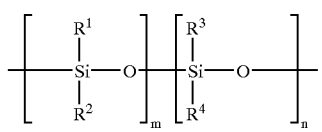

(1)

wherein $R^1$, $R^2$, $R^3$ and $R^4$ are independently a hydrogen atom, hydrocarbon group having 1 to 20 carbon atoms or a halogen atom, respectively, which may be the same or different, while m and n is an integer of 0 to 10000 which are not 0 concurrently.

Examples of the siloxane polymer which constitutes the component (B) include polydimethyl siloxane, polydiethyl siloxane, polydipropyl siloxane, polydibutyl siloxane, polydipentyl siloxane, polydihexyl siloxane, polydiheptyl siloxane, polydioctyl siloxane, polydinonyl siloxane, polydidecyl siloxane, polydiundecyl siloxane, polydidodecyl siloxane, polydiphenyl siloxane, polymethylphenyl siloxane, polymethylhydrogen siloxane, polymethylvinyl siloxane and a copolymer thereof. These are used alone or in combination of two or more. A preferable siloxane polymer can be selected out of these according to glass transition temperature required to the (B) component. In order to impart transparency to the thermoplastic resin composition, the siloxane polymer may be selected in such a way that the refraction index of the component (B) matches the refraction index of the thermoplastic resin to be combined.

The glass transition temperature of the component (B) is preferably at most 25° C., more preferably at most 0° C. and most preferably at most −20° C. When the glass transition temperature is higher than 25° C., impact resistance of the thermoplastic resin tends to decrease.

Process for preparing the above block copolymer (a) is not particularly limited, but controlled polymerization by using polymer initiator is preferably used. Examples of the controlled polymerization are living-anion polymerization, radical polymerization using chain transfer agent and recently developed living-radical polymerization, which is preferable from the viewpoint of controlling molecular weight and structure of the block copolymer.

The living-radical polymerization refers to radical polymerization, which maintains activity at the polymerizing end. The living polymerization narrowly means polymerization in which the end always maintains activity, while it generally includes pseudoliving polymerization, which has activated and inactivated ends in an equilibrium state. The latter definition is also applied to the present invention. Recently, various parties are making active researches on the living-radial polymerization. Examples thereof include polymerization by using a chain transfer such as polysulfide, polymerization by using a radial capping agent such as a cobalt porphyrin complex (J. Am. Chem. Soc. 1994, 116, 7943) or a nitroxide compound (Macromolecules, 1994, 27, 7228), atom transfer radical polymerization (ATRP) which has an organic halogenated compound or the like as an initiator with transition metal complex as a catalyst. There is no particular limitation for the use of these methods, but the atom transfer radical polymerization is preferable from the viewpoint of easy control.

In the atom transfer radical polymerization, the polymerization is initiated by an organic halogenated compound or a halogenated sulfonyl compound as an initiator with a metal complex whose central metal is an element selected from the eighth, ninth, tenth or eleventh group in the periodic table as a catalyst (for example, Matyjaszewski et al., J. Am. Chem. Soc. 1995, 117, 5614, Macromolecules 1995, 28, 7901, Science 1996, 272, 866, or Sawamoto et al. Macromolecules 1995, 28, 1721). According to these methods, they have very high polymerization rate in general. Although the polymerization is radical polymerization in which cessation reactions such as coupling of each radical are likely to occur, it proceeds in a living state, enabling to obtain a polymer which has a narrow molecular weight distribution (Mw/Mn= 1.1 to 1.5). The molecular weight can be controlled at will by charging ratio between the monomer and the initiator.

In the atom transfer radical polymerization method, examples of the organic halogenated compound or halogenated sulfonyl compound used as an initiator are a monofunctional, di-functional or multi-functional compound. These may be selected depending on objects. The monofunctional compound is preferable for preparing a di-block copolymer, the di-functional compound is preferable for preparing an A-B-A tri-block copolymer or a B-A-B triblock copolymer, and the multi-functional compound is preferable for preparing a branched block copolymer. A polymer initiator can be also used for the above initiator. The polymer initiator refers to, among the organic halogenated compound and halogenated sulfonyl compound, a compound comprising a polymer with a halogen atom at the molecular chain end. Such a polymer initiator can be obtained by a controlled polymerization method other than the living-radical polymerization, and there is a feature that a block copolymer can be prepared from polymers obtained by different polymerization methods.

The polymer initiator includes, for example, a siloxane polymer having end structure represented by the formula (2)

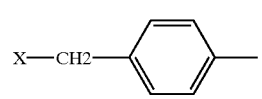

(2)

wherein X indicates a chlorine atom, a bromine atom or an iodine atom. The polymer initiator can be obtained by a process for preparing a polymer having, at the molecular chain end, a reactive functional group such as unsaturated double bond, a hydrosilyl group, a hydroxyl group and an alkoxysilyl group by living-anion polymerization or ring opening polymerization according to an acid catalyst, followed by reacting a compound such that it produces an organic halogenated compound and a halogenated sulfonyl compound at the end of the reactive functional group.

Additionally, there can be provided a polymer to which a functional group has been easily introduced by using a polymer initiator having a functional group other than the compound, which initiates polymerization. Examples of the functional group include an alkenyl group, a hydroxyl group, an epoxy group, an amino group, an amido group, a silyl group and the like.

A carbon atom to which a halogen atom is bonded bonds to a carbonyl group or to a phenyl group in the organic halogenated compound and the haloganated sulfonyl compound which are used as these initiator, and the carbon-halogen bond is activated to initiate the polymerization. The amount of the polymer initiator may be determined depending on its ratio to the monomers in accordance with the molecular weight of the required block copolymer. That is, the molecular weight of the block copolymer can be controlled by how many molecules of monomers are used per one molecule of the polymer initiator.

The above transition metal catalyst used as the catalyst in the atom transfer radical polymerization preferably includes, but not particularly limited to, a complex of monovalent or non-valent copper, a complex of bivalent ruthenium and a complex of bivalent iron or bivalent nickel. Among these, the complex of the copper is preferable from the viewpoint of costs and reaction control. Examples of the monovalent copper compound are copper (I) chloride, copper (I) bromide, copper (I) iodide, copper (I) cyanide, copper (I) oxide, copper (I) perchlorate and the like. When a copper compound is used, 2,2'-bipyridyl and derivatives thereof, 1,10-phenanthroline and derivatives thereof, and polyamines such as tetramethylethylenetriamine (TMEDA), pentamethyldiethylenetriamine and hexamethyl(2-aminoethyl)amine can be added as a ligand for improving catalytic activity. Tristriphenylphosphine complex of bivalent ruthenium ($RuCl_2(PPh_3)_3$) is also preferable as a catalyst. Aluminum alcoxides can be added as an activator when a ruthenium compound is used as the catalyst. A bistriphenylphosphine complex of bivalent iron ($FeCl_2(PPh_3)_2$), a bistriphenylphosphine complex of bivalent nickel ($NiCl_2(PPh_3)_2$) and a bistributylphosphine complex of bivalent nickel ($NiBr_2(PBu_3)_2$) are also preferable as the catalyst. The amounts of catalyst, ligand and activator are not particularly limited, but may be suitably determined depending upon the relationship among the amount of monomer, the amount of solvent and the required reaction rate.

The above atom transfer radical polymerization can be carried out without any solvent (bulk polymerization) or in various solvents. Examples of the above solvents are a hydrocarbon solvent such as benzene or toluene, an ether solvent such as diethyl ether or tetrahydrofuran, a halogenated hydrocarbon solvent such as methylene chrolide or chloroform, a ketone solvent such as acetone, methyl ethyl ketone, methyl iso-butyl ketone, an alcohol solvent such as methanol, ethanol, propanol, iso-propanol, n-butyl alcohol or tert-butyl alcohol, a nitrile solvent such as acetonitrile, propionitrile or benzonitrile, an ester solvent such as ethyl acetate or butyl acetate, and a carbonate solvent such as ethylene carbonate or propylene carbonate. These can be used alone or in combination of two or more. As mentioned above, the polymerization is bulk polymerization when there is no solvent. When a solvent is used, the amount thereof can be suitably determined according to the relationship between the viscosity of the whole system and the required stirring efficiency (i.e. reaction rate).

The above atom transfer radical polymerization can be performed in a range of room temperature to 200° C., preferably 50 to 150° C.

In order to prepare a block copolymer by the above atom transfer radical polymerization, there are a process for polymerizing the next block with a previously synthesized polymer as a polymer initiator, a process for combining separately polymerized polymers by reaction, and the like. These processes may be used depending on the object, but the process for polymerizing the next block with a previously synthesized polymer as a polymer initiator is preferable from the viewpoint that structure of the polymer can be easily controlled.

The graft copolymer (b) useful in the present invention is a graft copolymer containing a polymer component (C) whose glass transition temperature is lower than 25° C. and a polymer component (D) whose glass transition temperature is at least 25° C. The component (C) functions to improve impact resistance, while the component (D) functions to improve dispersability and interface adhesion with the thermoplastic resin.

The glass transition temperature of the component (C) which constitutes the above graft copolymer (b) is preferably lower than 25° C., more preferably at most 0° C. and most preferably at most −20° C. When the glass transition temperature of the component (C) is at least 25° C., improvement effect on impact resistance tends to decrease.

The glass transition temperature of the component (D) which constitutes the above graft copolymer (b) is preferably at least 25° C., more preferably at least 40° C. and most preferably at least 50° C. When the glass transition temperature of the component (D) is lower than 25° C., dispersability and interface adhesion with the thermoplastic resin tend to decrease.

The formation of the above graft copolymer (b) includes a comb-like graft copolymer having a main chain comprising the component (C) and branches comprising the component (D); a comb-like graft copolymer having branches comprising the component (C) and a main chain comprising the component (D); a graft copolymer of core-shell particles having an inner layer part (core) comprising the component (C) and an outer layer part (shell) comprising the component (D); a graft copolymer of core-shell particles having an inner layer part (core) comprising two kinds of the component (C) and an outer layer part (shell) comprising the component (D), wherein the inner layer part forms a salami-like structure; a graft copolymer of three-layered particles having a center part comprising the component (C), an interlayer part comprising the component (C) other than the component (C) which constitutes the center part, and an outer layer part comprising the component (D); a graft copolymer of three-layered particles having a center part comprising the component (D), an interlayer part comprising the component (C) and an outer layer part comprising the component (D) which may be the same as or different from the component constituting the center part; a graft copolymer of core-shell agglomerated particles having enlarged particle size, having an inner layer part (core) in which a plurality of particles (whose unit particle is constituted by at least one or two of the component (C) and each of which may be the same or different) comprising the component (C) are agglomerated to form one particle, and an outer layer part (shell) comprising the component (D); and the like.

These are used in accordance with the properties of the block copolymer and the thermoplastic resin to be combined with, but graft copolymer of particles is preferable from the viewpoints that the particle size of the dispersed particle can be easily controlled after mixing with the block copolymer (a) and the thermoplastic resin (c), and that impact resistance can be improved.

When the above graft copolymer (b) is a graft copolymer of particles, the average particle size is preferably 0.05 μm to 10 μm, more preferably 0.05 μm to 5 82 m, and most preferably 0.05 μm to 1 μm. When the average particle size is less than 0.05 μm, improvement effect on the impact resistance tends to decrease. When it is more than 10 μm, improvement effect on the impact resistance also tends to decrease.

When the above graft copolymer (b) is a graft copolymer of particles, the gel content is preferably 20 to 100% by weight, more preferably 40 to 100% by weight and most preferably 70 to 100% by weight. When the gel content is less than 20%, there is a tendency that improving effect on impact resistance and processability are insufficient.

The ratio of the component (C) to the component (D) in the above graft copolymer is not particularly limited, but preferably 30 to 95% by weight of the component (C) and 5 to 70% by weight of the component (D), and more preferably 40 to 90% by weight of the component (C) and 10 to 60% by weight of the component (D) based on the amount of the graft copolymer (b) in total. When the component (D) is less than 5% by weight, dispersion tends to be insufficient when it is mixed with the block copolymer (a) and the thermoplastic resin (c). When it is more than 70% by weight, impact resistance imparting effect tends to decrease.

The graft efficiency between the component (C) and the component (D) in the above graft copolymer (b) is not particularly limited, but preferably at least 30% by weight, and more preferably at least 50% by weight. When the graft efficiency is less than 30% by weight, dispersion tends to be insufficient when it is mixed with the block copolymer (a) and the thermoplastic resin (c).

The component (C) which comprises the above graft copolymer (b) is not particularly limited as long as it is a polymer component having glass transition temperature of less than 25° C., but preferably a polymer obtained by polymerizing a vinyl monomer and/or an organosiloxane monomer.

The above vinyl monomer is a compound which becomes a vinyl polymer by addition polymerization. Examples thereof include an olefin such as ethylene, propylene, n-butene, iso-butylene, n-hexene or n-octene; an acrylate ester such as methyl acrylate, ethyl acrylate, n-propyl acrylate, n-butyl acrylate, 2-ethylhexyl acrylate or n-octyl acrylate; a methacrylate ester such as methyl methacrylate, ethyl methacrylate, butyl methacrylate, 2-ethylhexyl methacrylate, cyclohexyl methacrylate, benzyl methacrylate or isobornyl methacrylate; an aromatic alkenyl compound such as styrene, a-methylstyrene, p-methylstyrene or vinyltoluene; a vinyl cyanide compound such as acrylonitrile or methacrylonitrile; a conjugated diene compound such as butadiene or isoprene; a halogen-containing unsaturated compound such as vinyl chloride or vinylidene chloride; and the like. These may be used alone or in combination of two or more. Among these, n-butyl acrylate, butadiene, styrene/butadiene and iso-butylene are preferable from the viewpoints of versatility, low cost and easy handling.

The organosiloxane monomers are organosiloxane compounds which becomes siloxane polymer by condensation-polymerization or ring-opening polymerization. Examples thereof are, for instance, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, octaethylcyclotetrasiloxane, dimethyldimethoxysilane, diethydimethoxysilane, diethyldiethoxysilane, diphenyldimethoxysilane, and the like. These may be used alone or in combination of two or more. Among these, octamethylcyclotetrasiloxane is preferable from the viewpoints of versatility, low cost and easy handling.

The component (C) which constitutes the graft copolymer (b) used in the present invention may contain a unit derived from a crosslinking agent and/or a graftlinking agent mentioned after.

The content of the unit derived from a crosslinking agent and/or a graftlinking agent in the component (C) is from 0 to 20% by weight, preferably from 0 to 10% by weight, for the unit derived from the crosslinking agent, and is from 0 to 20%, preferably from 0 to 10% by weight, for the unit derived from the graftlinking agent. These ranges are desirable from the viewpoint of a balance between improving effect on impact resistance and processability.

The above crosslinking agent is a compound having a plurality of functional groups in one molecule, and these plural functional groups have the same reactivity. The above graftlinking agent is a compound having a plurality of functional groups in one molecule, and these plural functional groups have a different reactivity. The crosslinking agent is used for the purpose of producing crosslinkages in a single polymer component, and the graftlinking agent is used for the purpose of producing crosslinkages between different polymer components. In practical action, however, there are cases where the crosslinking agent may produce crosslinkages between different polymer components, and the graftlinking agent may produce crosslinkages in a single polymer component, so the distinction of the actions of both agents is not definite.

When a vinyl monomer is used, examples of the crosslinking agent are, for instance, a difunctional vinyl compound such as ethylene glycol dimethacrylate, propylene glycol dimethacrylate, 1,3-butylene glycol dimethacrylate, 1,4-butylene glycol dimethacrylate or divinyl benzene; and a trifunctional vinyl compound such as triallyl cyanurate or triallyl isocyanurate. When an organosiloxane monomer is used, examples of the crosslinking agent are a trifunctional silane compound such as trimethoxymethylsilane or triethoxyphenylsilane; a tetrafunctional silane compound such as tetramethoxysilane, tetraethoxysilane, tetrapropoxysilane or tetrabutoxysilane; and the like. These may be used alone or in combination of two or more. These crosslinking agents can be suitably selected according to the kind of a polymer to be crosslinked.

When a vinyl monomer is used, examples of the graftlinking agent are, for instance, a vinyl compound such as allyl methacrylate or allyl acrylate. When an organosiloxane monomer is used, examples of the graftlinking agent are, for instance, a (meth)acrylic functional silane compound such as β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, γ-methacryloyloxypropyltriethoxysilane, δ-methacryloyloxybutyldiethoxymethylsilane, γ-acryloyloxypropyldimethoxymethylsilane or γ-acryloyloxypropyl trimethoxysilane; an ethylenic functional silane compound such as vinyltrimethoxysilane, vinyldimethoxymethylsilane, vinyltriethoxysilane, p-vinylphenyltrimethoxysilane or P-vinylphenyldimethoxymethylsilane; a mercapto functional silane compound such as γ-mercapto propyltrimethoxysilane or γ-mercaptopropyldimethoxymethylsilane; and the like. These may be used alone or in combination of two or more. These graftlinking agents can be suitably selected according to the kind of a polymer to be graftlinked.

The component (D) which constitutes the above graft copolymer (b) is not particularly limited as long as it is a polymer component having glass transition temperature of at least 25 ° C., but preferably a vinyl polymer obtained by polymerizing a vinyl monomer.

Examples of the vinyl monomer includes an acrylate ester such as methyl acrylate, ethyl acrylate, n-propyl acrylate, n-butyl acrylate, 2-ethylhexyl acrylate or n-octyl acrylate; a methacrylate ester such as methyl methacrylate, ethyl methacrylate, butyl methacrylate, 2-ethylhexyl methacrylate, cyclohexyl methacrylate, benzyl methacrylate or isobornyl methacrylate; an aromatic alkenyl compound such as styrene, α-methylstyrene or p-methylstyrene or vinyltoluene; a vinyl cyanide compound such as acrylonitrile or methacrylonitrile; a conjugated diene compound such as butadiene or isoprene; and a halogen-containing unsaturated compound such as vinyl chloride or vinylidene chloride. These may be used alone or in combination of two or more. These vinyl monomers are suitably selected in accordance with combination with the block copolymer (a) and the thermoplastic resin (c).

Improving effect on dispersability and interface adhesion with various thermoplastic resins can be exerted by using at least one vinyl monomer selected from the group consisting of the above acrylate ester, methacrylate ester, an aromatic alkenyl compound, a vinyl cyanide compound, a conjugated diene compound and halogen-containing unsaturated compound.

Also, when a thermoplastic resin composition requires transparency, it can be achieved by matching the refraction index of the above graft copolymer with the refraction index of the thermoplastic resin.

The process for preparing the above graft copolymer (b) is not particularly limited, but emulsion polymerization by using an aqueous dispersant medium and an emulsifier is preferable from the viewpoints of low production cost and ease in removing the heat of reaction.

In case of using a radically polymerizable vinyl monomer for the component (C), normal emulsion radical polymerization can be applied, while a method of emulsion-dispersion of a pre-polymer obtained by ionic polymerization such as cation polymerization, anion polymerization and coordination polymerization into an aqueous dispersion medium can be applied in case of using a vinyl monomer less radically polymerizable. Also, when an organosiloxane monomer is used for the component (C), it is possible to use a method of emulsion-dispersion of the organosiloxane monomer into an aqueous dispersion medium and conducting condensation-polymerization or ring-opening polymerization in the presence of a catalyst such as acid, base or an organometal compound. Additionally, in case of preparing a graft copolymer of particles which contains a plurality of polymer components in a single particle, it can be prepared by a method wherein respective monomer components are previously mixed uniformly, emulsified and subjected to a reaction, a method wherein, in the presence of seed particles composed of a single polymer component, other components are further subjected to polymerization (seed polymerization), a method wherein particles each comprising a single polymer component are mixed and are then agglomerated to enhance the particle size by adding an acid. such as hydrochloric acid or a salt such as sodium sulfate, or other methods. At that time, the state inside the obtained particles (phase structure) can be controlled by the preparation method, the proportions of respective components, the order of reaction, and the like.

In order to graft-polymerize the component (D), it is possible to use a method in which a vinyl monomer is added in a single or multi-stages to the emulsion dispersion solution of the component (C) and is subjected to polymerization according to radical polymerization technology.

The emulsified dispersion solution (latex) of the graft copolymer (b) prepared according to the above method can be used by salting out the latex to separate and recover the graft copolymer (b).

Examples of the graft copolymer (b) include an MBS resin, an acrylic graft copolymer, an acrylic-silicone composite rubber graft copolymer, polyiso-butylene-acrylic composite rubber graft copolymer and the like. MBS resins such as Kaneace B series and Kaneace M series (both available from Kaneka Corp.), acrylic graft copolymers such as Kaneace FM series (available from Kaneka Corp.), acrylic-silicone composite rubber graft copolymers such as Metablen S-2001 (available from Mitsubishi Rayon Co., Ltd.) are available as industrial products. A polyiso-butylene-acrylic composite rubber graft copolymer can be prepared according to the process disclosed in Japanese Unexamined Patent Publication No. 302169/1997.

The ratio of the block copolymer (a) and the graft copolymer (b) which constitute the elastomer composition of the present invention is not particularly limited, but preferably 0.1 to 99% by weight of the block copolymer (a) and 99.9 to 1% by weight of the graft copolymer (b), more preferably 0.5 to 95% by weight of the block copolymer (a) and 99.5 to 5% by weight of the graft copolymer (b), most preferably 1 to 90% by weight of the block copolymer (a) and 99 to 10% by weight of the graft copolymer (b). The more preferable the range of the mixing ratio is, the higher improving effect on impact resistance tends to be when it is mixed with the thermoplastic resin (c).

Conventional processes can be applied for preparing the elastomer composition of the present invention, including a process for simply mixing the block copolymer (a) and the graft copolymer (b) in the form of powder, flake, pellet or clam, a process for mechanical mixing according to a known apparatus such as Henschel mixer or ribbon blender and a process for mechanical melt-mixing according to a known apparatus such as Banbury mixer, roll mill or twin-screw extruder. The thus obtained elastomer composition can be used as an impact modifier by mixing it with the thermoplastic resin (c). In addition, the above elastomer composition can be directly used as a rubber material for packaging materials, materials for medical use, materials for food, materials for automobiles, damping materials, sealing materials and the like, in the same manner as a usual thermoplastic elastomer.

The elastomer composition may be further incorporated with a stabilizer, a plasticizer, a lubricant, a flame retardant, a pigment, a filler, a processing aid and the like, if required. More particular examples thereof include a stabilizer such as triphenyl phosphite, hindered phenol or dibutyl tin maleate; a plasticizer such as paraffine oil, polybutene oil, silicone oil, light oil, spindle oil, machine oil, linseed oil, sesame oil, castor oil, tsubaki oil, dioctyl phthalate, dibutyl phthalate, dioctyl adipate or tricresyl phosphate; a lubricant such as polyethylene wax, polypropylene wax or montan wax; a flame retardant such as triphenyl phosphate, tricresyl phosphate, decabromobiphenyl or decabromobiphenyl ether or antimony trioxide; a pigment such as titanium oxide, zinc sulfide or zinc oxide; a filler such as glass fiber, asbestos, wollastonite, mica, talc or calcium carbonate; a processing aid such as high-molecular-weight methacrylate resin known as Kaneace PA (available from Kaneka Corp.); and the like.

The thermoplastic resin (c) useful in the present invention includes, for instance, poly(vinyl chloride) resin, polyethylene resin, polypropylene resin, cyclic olefin copolymer resin, poly(methyl methacrylate) resin, a homopolymer or a copolymer obtained by polymerizing 70 to 100% by weight of at least one vinyl monomer selected from the group consisting of an aromatic alkenyl compound, a vinyl cyanide compound and (meth)acrylate ester, with 0 to 30% by weight of another vinyl monomer compolymerizable therewith such as ethylene, propylene or vinyl acetate, and/or a diene monomer copolymerizable therewith such as butadiene or isoprene. Other examples thereof are polystyrene resin, polyphenylene ether resin, a mixture of polystyrene resin and polyphenylene ether resin, polycarbonate resin, polyester resin, a mixture of polycarbonate resin and polyester resin, polyamide resin, polyacetal resin, polyphenylene sulfide resin, polysulfone resin, polyimide resin, polyether imide resin, polyether ketone resin, polyetherether ketone resin, polyamideimide resin, polyacrylate resin and the like. These can be used alone or in combination of two or more. There is no limitation for the thermoplastic resins, and various thermoplastic resins can be widely used in the present invention.

Among the above thermoplastic resins, it is preferable to use at least one of poly(vinyl chloride) resin, poly(methyl methacrylate) resin, acrylonitrile-styrene copolymer resin, methyl methacrylate-styrene copolymer resin, polycarbonate resin, polyester resin and polyamide resin because they have excellent compatibility with the elastomer composition used in the present invention and high impact resistance can be easily achieved thereby.

The mixing ratio of the above elastomer composition and the thermoplastic resin (c) is not particularly limited, but 1 to 99% by weight of the elastomer composition and 99 to 1% by weight of the thermoplastic resin (c), preferably 1 to 70% by weight of the elastomer composition and 99 to 30% by weight of the thermoplastic resin (c), more preferably 1 to 50% by weight of the elastomer composition and 99 to 50% by weight of the thermoplastic resin (c), most preferably 1 to 30% by weight of the elastomer composition and 99 to 70% by weight of the thermoplastic resin (c). When the amount of the elastomer composition is less than 1% by weight, improving effect on impact resistance tends to decrease. When it is more than 99% by weight, it tends to be difficult to express the properties of the thermoplastic resin.

Conventional processes can be applied for preparing the thermoplastic resin composition of the present invention, including a process for mechanical melt-mixing according to a known apparatus such as Banbury mixer, roll mill or twin-screw extruder to form the composition into pellet. In this case, a previously mixed elastomer composition may be mixed with the thermoplastic resin (c), or the block copolymer (a) and the graft copolymer (b) may be mixed with the thermoplastic resin (c) at one time. The formed pellets can be molded in a wide range of temperature by a usual injection molding machine, blow molding machine, extruder or compression molding machine or the like.

The thermoplastic resin composition may be further incorporated with a stabilizer, a plasticizer, a lubricant, a flame retardant, a pigment, a filler, a processing aid and the like, if required. Examples thereof include a stabilizer such as triphenyl phosphite, hindered phenol or dibutyl tin maleate; a plasticizer such as paraffine oil, polybutene oil, silicone oil, light oil, spindle oil, machine oil, linseed oil, sesame oil, castor oil, tsubaki oil, dioctyl phthalate, dibutyl phthalate, dioctyl adipate or tricresyl phosphate; a lubricant such as polyethylene wax, polypropylene wax or montan wax; a flame retardant such as triphenyl phosphate, tricresyl phosphate, decabromobiphenyl or decabromobiphenyl ether or antimony trioxide; a pigment such as titanium oxide, zinc sulfide or zinc oxide; a filler such as glass fiber, asbestos, wollastonite, mica, talc or calcium carbonate; a processing aid such as high-molecular-weight methacrylate resin known as Kaneace PA (available from Kaneka Corp.); and the like, The present invention is more specifically explained by means of the following examples, but is not limited only to these examples. Preparation Example 1 (Methyl methacrylate-dimethyl siloxane block copolymer)

To a mixture of 15.3 g of p-vinylbenzyl chloride, 50 ml of diethyl ether and 0.38 ml of 0.132 mol/l xylene solution of $Pt[\{(CH_2=CH)(CH_3)_2Si\}_2O_2]$ complex was gradually added 12.3 g of dimethyl chlorosilane at room temperature under atmospheric air with stirring. After an hour of stirring, it was placed under nitrogen atmosphere, and 2.5 g of lithium aluminum hydride was added thereto with cooling by means of ice water. Thereto was added 100 ml of hexane after an hour of stirring, and diethyl ether and unreacted dimethyl chlorosilane were distilled off under reduced pressure. Further, 100 ml of hexane was added thereto, unreacted lithium aluminum hydride was removed by passing the resulting mixture through an alumina column, and then hexane was distilled off under reduced pressure to obtain an oily product. The product was confirmed to be 2-(4'-chloromethyl phenyl) ethyldimethylsilane by $^1$H-NMR.

A mixture of 100 g of both-end vinyl dimethylsilyl-poly (dimethyl siloxane) (vinyl content of 0.05 mol/kg), 12.3 g of 2-(4'-chloromethyl phenyl) ethyldimethylsilane, 0.19 ml of 0.132 mol/l xylene solution of $Pt[\{(CH_2=CH)(CH_3)_2Si\}_2O_2]$ complex and 100 ml of toluene was stirred under atmospheric air at 70° C. for two hours. The obtained mixture was dropped into a large amount of methanol to reprecipitate the polymer, and the solvent was removed by decantation. The product was confirmed to be poly(dimethyl siloxane) having chloromethyl phenyl groups at the both ends by $^1$H-NMR.

The temperature of a mixture of 83.5 g of both-end chloromethylphenyl-poly(dimethyl siloxane), 73.0 g of methyl methacrylate, 2.0 g of copper chloride (I), 12.2 g of acetonitrile and 54.0 g of toluene was elevated to 100° C. under nitrogen atmosphere. With stirring, 1.6 ml of pentamethyl diethylenetriamine was added thereto. After stirring for three hours, 500 ml of toluene was added thereto and the mixture was cooled to room temperature. The conversion ratio of methyl methacrylate was 50%. The mixture was passed through an alumina column to remove copper chloride, and then it was dropped into a large amount of methanol to reprecipitate the polymer, and the solvent was removed by filtration. The first structure of the product, i.e., a methyl methacrylate-dimethylsiloxane block copolymer (hereinafter referred to as B-1) was confirmed by the following method. The weight average. molecular weight (Mw) was 80,000, the number average molecular weight (Mn) was 57,000 and the molecular weight distribution (Mw/Mn) was 1.40. The blocking ratio was 90%, and the weight percentages of poly(dimethyl siloxane) and poly (methyl methacrylate) in the block copolymer were 70% by weight and 30% by weight, respectively. The glass transition temperature measured according to the following method was −120° C. for poly(dimethyl siloxane) block and 105° C. for poly(methyl methacrylate) block. The obtained block copolymer is a tri-block copolymer.

(Molecular Weight and Molecular Weight Distribution)

The molecular weight was calculated as polystyrene according to GPC measurement by using polystyrene gel column with chloroform as an eluent.

(Blocking Ratio)

Hexane was used to separate soluble portion from insoluble portion, and the soluble portion was removed as homopoly(dimethyl siloxane). Next, a mixed solution of chloroform and methanol in 20/80 (% by weight) was used to separate soluble portion from insoluble portion, and the soluble portion was removed as homopoly(methyl methacrylate). The remaining insoluble portion was regarded as a block copolymer, and weight percentage thereof is described as the blocking ratio. Also, weight percentages of poly(dimethyl siloxane) and poly(methyl methacrylate) were confirmed by $^1$H-NMR. (Glass Transition Temperature)

The glass transition temperature was measured by using DSC (differential scanning calorimetry) according to JIS K7121 at a temperature elevation rate of 20° C./min.

EXAMPLE 1

An elastomer composition was obtained by mixing methyl methacrylate-dimethyl siloxane block copolymer B-1 with methyl methacrylate-butyl acrylate graft copolymer FM-21 (available from Kaneka Corp., having Tg of −40° C. at the inner layer, the poly(butyl acrylate) part, and Tg of 96° C. at the outer layer, the poly(methyl methacrylate) part) as an impact modifier in a weight ratio of 5/95. Then, to a mixture of 100 parts of a vinyl chloride resin (S1008, available from Kaneka Corporation) as a thermoplastic resin, 2.5 parts of dibutyl tin maleate as a stabilizer, 0.5 part of Hoechst Wax E (available from Hoechst Japan) as a lubricant, 2.0 parts of PA-20 (available from Kaneka Corp.) as a processing aid and 3.0 parts of titanium oxide as a pigment was added 12 parts of the impact modifier comprising the elastomer composition. The mixture was kneaded for five minutes through rolls set at 180° C. to form a sheet, and the obtained sheet was subjected to heat press molding at set temperature of 190° C. to give a specimen of a 5 mm thick molded article for evaluation of physical properties.

The Izod impact strength of the obtained molded article was 96 kg.cm/cm in accordance with the following method.
(Izod impact strength)

Measurment was carried out based on the method described in ASTM D256-56 under conditions of n=5 at 23° C. by using a V-notched specimen, and the mean value thereof was adopted as Izod impact strength.

EXAMPLE 2

A molded article was prepared in the same manner as in Example 1 except for using, as an impact modifier, an elastomer composition obtained by mixing methyl methacrylate-dimethyl siloxane block copolymer B-1 with methyl methacrylate-butyl acrylate graft copolymer FM-21 (available from Kaneka Corp.) in a weight ratio of 20/80. The izod impact strength was measured to be 113 kg·cm/cm.

Comparative Example 1

A molded article was prepared in the same manner as in Example 1 without using any impact modifier. The izod impact strength was measured to be 3 kg·cm/cm.

Comparative Example 2

A molded article was prepared in the same manner as in Example 1 except that only methyl methacrylate-dimethyl siloxane block copolymer B-1 was used as an impact modifier. The izod impact strength was measured to be 15 kg·cm/cm.

Comparative Example 3

A molded article was prepared in the same manner as in Example 1 except that only methyl methacrylate-butyl acrylate graft copolymer FM-21 (available from Kaneka Corp.) was used as an impact modifier. The izod impact strength was measured to be 10 kg·cm/cm.

The results of Examples 1 to 2 and Comparative Examples 1 to 3 show that improving effect on impact resistance becomes remarkably high by combining a small amount of methyl methacrylater-dimethyl siloxane block copolymer with methyl methacrylate-butyl acrylate graft copolymer. Also, improving effect on impact resistance in case of the combination use is beyond calculation compared with the case where the respective component is independently added as an impact modifier.

EXAMPLE 3

A molded article was prepared in the same manner as in Example 1 except for using, as an impact modifier, an elastomer composition obtained by mixing methyl methacrylate-dimethyl siloxane block copolymer B-1 with methyl methacrylate-butyl acrylate graft copolymer FM-21 (available from Kaneka Corp.) in a weight ratio of 20/80, and for adding 10 parts by weight of the impact modifier. The izod impact strength was measured to be 43 kg·cm/cm.

EXAMPLE 4

A molded article was prepared in the same manner as in Example 3 except for using, as an impact modifier, an elastomer composition obtained by mixing methyl methacrylate-dimethyl siloxane block copolymer B-1 with methyl methacrylate-butyl acrylate graft copolymer FM-21 (available from Kaneka Corp.) in a weight ratio of 50/50. The izod impact strength was measured to be 36 kg·cm/cm.

EXAMPLE 5

A molded article was prepared in the same manner as in Example 3 except for using, as an impact modifier, an elastomer composition obtained by mixing methyl methacrylate-dimethyl siloxane block copolymer B-1 with methyl methacrylate-butyl acrylate graft copolymer FM-21 (available from Kaneka Corp.) in a weight ratio of 70/30. The izod impact strength was measured to be 57 kg·cm/cm.

Comparative Example 4

A molded article was prepared in the same manner as in Example 3 except that only methyl methacrylate-dimethyl siloxane block copolymer B-1 was used as an impact modifier. The izod impact strength was measured to be 9 kg·cm/cm.

Comparative Example 5

A molded article was prepared in the same manner as in Example 3 except that only methyl methacrylate-butyl acrylate graft copolymer FM-21 (available from Kaneka Corp.) was used as an impact modifier. The izod impact strength was measured to be 6 kg·cm/cm.

The results of Examples 3 to 5 and Comparative Examples 4 to 5 show that improving effect on impact resistance by combining methyl methacrylate-dimethyl siloxane block copolymer with methyl methacrylate-butyl acrylate graft copolymer can be expressed in an extensive range of weight ratio.

Preparation Example 2 (Methyl Methacrylate-butyl Acrylate-styrene Graft Copolymer)
(a) Polymerization of Cross-linked Methacrylate Copolymer (for Innermost Layer)

A separable glass flask was charged with 220 parts by weight of ion exchange water, 0.32 part by weight of boric acid, 0.03 part by weight of sodium carbonate, 0.09 part by weight of sodium N-lauroyl sarcosinate, 0.09 part by weight of formaldehyde sodium sulfoxylate, 0.008 part of sodium ethylenediaminetetraacetate and 0.002 part by weight of ferrous sulfate heptahydrate. The temperature of the mixture was raised to 80° C. with stirring under nitrogen stream. Thereto was charged batchwise 25% of the mixed solution containing the innermost monomer component comprising 96 parts by weight of methyl methacrylate, 4 parts by weight of n-butyl acrylate and 0.4 part by weight of allyl methacrylate, and 0.13 part by weight of 69% t-butyl hydroperoxide solution, and polymerization was conducted for 45 minutes. The rest of the mixed solution, 75% the total, was continuously added thereto over an hour. After the addition was finished, the mixture was kept at the same temperature for an hour to complete the polymerization. During this period, 0.2 part by weight of sodium N-lauroyl sarcosinate was added thereto. The obtained latex of a cross-linked methacrylic copolymer for the innermost layer had an average particle size of 1,600 Å (measured according to light scattering by using light having a wavelength of 546 μm), and the polymerization conversion ratio (amount of polymer generation/amount of charged monomer×100) was 98%.

(b) Polymerization of Rubber Polymer (for Interlayer)

The latex of cross-linked methacrylate polymer prepared in the above (a) was kept under nitrogen stream at 80° C. Thereto was added 0.1 part by weight of 69% t-butyl hydroperoxide solution, and the mixture was left for 30 minutes. After that, 0.13 part by weight of potassium persulfate was added thereto, and then a monomer mixture comprising monomer components of 82 parts by weight of n-butyl acrylate, 18 parts by weight of styrene and 1.5 parts by weight of allyl methacrylate was continuously added thereto over five hours. During this period, to the mixture was continuously added 0.11 part by weight of pottasium oleate. After finish of the addition of the monomer mixture, 0.05 part by weight of potassium persulfate was further added thereto and the mixture was kept for two hours to complete the polymerization. The obtained polymer had an average particle size of 2,300 Å, and the polymerization conversion ratio was 99%.

(c) Polymerization of Graft Copolymer (for Outermost Layer)

The latex of rubber polymer prepared in the above (b) was kept at 80° C., and 0.02 part by weight of potassium persulfate was added thereto. Next, a mixed solution of 96 parts by weight of methyl methacrylate, 4 parts by weight of n-butyl acrylate and 0.15 part by weight of t-dodecyl mercaptan was continuously added thereto over 1.25 hours. After finish of the addition of the monomer mixture, it was kept for an hour to obtain a latex of a graft copolymer having multi-layered structure. The graft copolymer of multi-layered structure had an average particle size of 2,530 Å, and the polymerization conversion was 99.5%.

According to known processes, the obtained latex of a graft copolymer having multi-layered structure was coagulated by salting out, thermally treated and dried to prepare a methyl methacrylate-butyl acrylate-styrene graft copolymer having a multi-layered structure (G-1) in white powder. These processes are known processes. The polymer (G-1) had Tg of 104° C. at the innermost layer, Tg of –15° C. at the interlayer, and Tg of 104° C. at the outermost layer.

EXAMPLE 6

An elastomer composition was obtained by mixing methyl methacrylate-dimethyl siloxane block copolymer B-1 with methyl methacrylate-butyl acrylate-styrene graft copolymer (G-1) as an impact modifier in a weight ratio of 10/90. To 84 parts by weight of methacrylic resin Parapet G1000 (available from Kurarey Co., Ltd.) as a thermoplastic resin was added 16 parts by weight of an impact modifier, and the mixture was kneaded and pelletized at set temperature of 230° C. by a twin-screw extruder equipped with a vent (32 mm, L/D=25.5). The obtained pellets were dried at 80° C. for 15 hours and then subjected to injection molding at set temperature of 230° C. to give a plaque molded article (having a size of 120×120×3 (thickness) (mm)) for evaluation of physical properties.

The Gardner strength was measured in accordance with the following method, and the value was 42 kg·cm.

(Gardner strength)

Measurement was carried out based on the method described in ASTM D3029-84-GB under conditions of n=40 at 23° C. by using a weight of 700g.

Comparative Example 6

A molded article was prepared in the same manner as in Example 6 except that only methyl methacrylate-butyl acrylate-styrene graft copolymer G-1 was used as an impact modifier. The Gardner strength was measured to be 16 kg·cm.

The results of Example 6 and Comparative Example 6 show that improving effect on impact resistance can. be increased by combining methyl methacrylate-dimethyl siloxane block copolymer with methyl methacrylate-butyl acrylate-styrene graft copolymer in a methacrylate resin as well as in a vinyl chloride resin.

Preparation Example 3

(a) Polymerization of Rubber Polymer (for Inner Layer)

Under nitrogen stream, 220 parts by weight of water, 0.5 part by weight of potassium rhodinate, 0.5 part by weight of sodium oleate, 0.4 part of formaldehyde sodium sulfoxylate, 0.008 part by weight of sodium ethylenediaminetetraacetate and 0.002 part by weight of ferrous sulfate heptahydrate was mixed and the temperature was kept to 40° C. With stirring, thereto was added batchwise the mixed solution of 80 parts by weight of n-butyl acrylate, 0.4 part by weight of allyl methacrylate and 0.2 part by weight of cumene hydroperoxide in such amount that 7 parts by weight of n-butyl acrylate is contained, and polymerization was conducted for 1.5 hours. Then thereto was added the rest of the above mixture corresponding to an amount of 73 parts by weight of n-butyl acrylate over 5.5 hours. During this period, 1 part by weight of sodium oleate was continuously added thereto. After the addition of monomers was finished, the mixture was kept at the 40° C. for 2.5 hours to complete the polymerization. The polymerization conversion ratio was 95%. The average particle size at the completion of the polymerization was 2,200 Å (measured according to light scattering by using light having a wavelength of 546 μm), and portion which is insoluble to toluene accounted for 85% in the rubber. (b) Polymerization of graft copolymer (for outer layer)

The aqueous dispersing solution in which rubber polymers are dispersed prepared in the above (a) was heated to 50° C. under nitrogen stream. Thereto was continuously added 5 parts by weight of methyl methacrylate, 0.5 part by weight of allyl methacrylate and cumene hydroperoxide over 30 minutes, and the mixture was kept for 45 minutes.

Also, 15 parts by weight of methyl methacrylate, 0.07 part by weight of cumene hydroperoxide, 0.5 part by weight of oleic acid were added over 1.25 hours. Then 0.02 part by weight of cumene. hydroperoxide was added thereto and postpolymerization was conducted for two hours to complete polymerization. The polymerization conversion was 95%.

The obtained latex was coagulated, thermally treated and dried according to a usual method to prepare a methyl methacrylatebutyl acrylate graft copolymer (G-2) in white powder. The polymer (G-2) had Tg of −42° C. at the inner layer, and Tg of 108° C. at the outer layer.

EXAMPLE 7

An elastomer composition was obtained by mixing methyl methacrylate-dimethyl siloxane block copolymer B-1 with methyl methacrylate-butyl acrylate graft copolymer (G-2) as an impact modifier in a weight ratio of 20/80. To 95 parts by weight of a polycarbonate resin Lexane 141R-111 (available from Nippon GE Plastics Co., Ltd.) as a thermoplastic resin and 0.3 part by weight of Topanol CA (available from Lipre Co., Ltd.) and Adecustab PEP-36 (available from Asahi Denka Kogyo K. K.) as stabilizers, was mixed 5 parts by weight of the impact modifier. The mixture was kneaded and pelletized at set temperature of 280° C. by using a twin-screw extruder equipped with a vent (32 mm, L/D=25.5). The obtained pellets were dried at 80° C. for 15 hours and then subjected to injection molding at set temperature of 280° C. to give a molded article (having a thickness of 1/4) for evaluation of physical properties.

The izod impact strength of the obtained molded article was 50 kg·cm/cm when measured at 0° C.

Comparative Example 7

A molded article was prepared in the same manner as in Example 7 except that only methyl methacrylate-butyl acrylate graft copolymer G-2 was used as an impact modifier. The izod impact strength was 20 kg·cm/cm when measured at 0° C.

The results of Example 7 and Comparative Example 7 show that improving effect on impact resistance can be also increased in a polycarbonate resin by combining methyl methacrylate-dimethyl siloxane block copolymer with methyl methacrylate-butyl acrylate graft copolymer.

EXAMPLE 8

An elastomer composition was obtained by mixing methyl methacrylate-dimethyl siloxane block copolymer B-1 with methyl methacrylate-butyl acrylate graft copolymer (G-2) as an impact modifier in a weight ratio of 10/90. To 95 parts by weight of a poly(butylene terephtharate) resin Celanex 1600A (available from Hochst Celanese Co., Ltd.) as a thermoplastic resin and 0.3 part by weight of Topanol CA (available from Lipre Co., Ltd.) and ADK STAB PEP-36 (available from Asahi Denka Kogyo K. K.) as stabilizers, was mixed 5 parts by weight of the impact modifier. The mixture was kneaded and pelletized at set temperature of 245° C. by using a twin-screw extruder equipped with a vent (32 mm, L/D=25.5). The obtained pellets were dried at 80° C. for 15 hours and then subjected to injection molding at set temperature of 250° C. to give a molded article (having a thickness of 1/8 inch) for evaluation of physical properties.

The izod impact strength of the obtained molded article was 50 kg·cm/cm when measured at 0° C.

Comparative Example 8

A molded article was prepared in the same manner as in Example 8 except that only methyl methacrylate-butyl acrylate graft copolymer G-2 was used as an impact modifier. The izod impact strength was 23 kg·cm/cm when measured at 0° C.

The results of Example 8 and Comparative Example 8 show that improving effect on impact resistance can be also increased in a poly(butylene terephtharate) resin by combining methyl methacrylate-dimethyl siloxane block copolymer with methyl. methacrylate-butyl acrylate graft copolymer.

INDUSTRIAL APPLICABILITY

The elastomer composition of the present invention is useful as an impact modifier, and capable of improving impact resistance with maintaining properties inherent to thermoplastic resins such as weatherability and thermal stability. It can also be used as a rubber material for packaging materials, materials for medical use, materials. for food, materials for automobiles, damping materials, sealing materials and the like, other than the impact modifier.

In addition, the thermoplastic resin composition of the present invention is capable of providing a molded article having an excellent improving impact resistance with maintaining properties inherent to thermoplastic resins such as weatherability and thermal stability. It can be expected that water proofing, sliding property, processability and the like as well as impact resistance are also improved in the thermoplastic resin composition of the present invention.

Accordingly, the thermoplastic resin composition of the present invention can be suitably used for preparing various molded articles such as extrudate including sheets, films, plates and profiles, calender molded articles, blow molded articles including bottles and the like, and various injection molded articles used for automobiles or household electrical goods useful as packaging materials, materials for construction and civil engineering, materials for automobiles, materials for home electric appliances and materials for other general goods, and it is of great industrial value.

What is claimed is:

1. An elastomer composition comprising 1 to 99% by weight of a block copolymer (a) containing a methacrylate polymer and a siloxane polymer and 99 to 1% by weight of a graft copolymer (b) containing a polymer component whose glass transition temperature is lower than 25° C. and a polymer component whose glass transition temperature is at least 25° C.

2. The elastomer composition of claim 1, wherein said block copolymer (a) is a di-block copolymer or a tri-block copolymer.

3. The elastomer composition of claim 1, wherein number average molecular weight of said block copolymer (a) is 30,000 to 500,000.

4. The elastomer composition of claim 1, wherein the ratio of weight average molecular weight Mw to number average molecular weight Mn of the block copolymer (a) (Mw/Mn) measured by gel permeation chromatography is at most 1.8.

5. The elastomer composition of claim 1, wherein the block copolymer (a) contains 5 to 90% by weight of a methacrylate polymer and 95 to 10% by weight of a siloxane polymer.

6. The elastomer composition of claim 1, wherein glass transition temperature of said methacrylate polymer is at least 25° C.

7. The elastomer composition of claim 1, wherein said siloxane polymer comprises repeating units represented by the general formula (1):

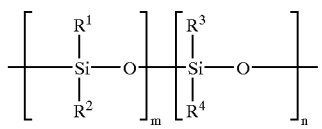

wherein $R^1$, $R^2$, $R^3$ and $R^4$ are independently a hydrogen atom, hydrocarbon group having 1 to 20 carbon atoms or a halogen atom, respectively, which may be the same or different, while m and n is an integer of 0 to 10000 which are not 0 concurrently.

8. The elastomer composition of claim 1, wherein glass transition temperature of said siloxane polymer is at most 25° C.

9. The elastomer composition of claim 1, wherein said block copolymer is prepared by atom transfer polymerization by using a polymer initiator.

10. The elastomer composition of claim 9, wherein said block copolymer is prepared by using a siloxane polymer having a halogen atom at its end as a polymer initiator.

11. The elastomer composition of claim 10, wherein said block copolymer is prepared by using, as a polymer initiator, the siloxane polymer containing a halogen atom at its end, and, as a catalyst, a metal complex whose central metal is an element selected from the eighth, ninth, tenth or eleventh group in the periodic table.

12. The elastomer composition of claim 9, wherein said block copolymer is prepared by using a siloxane polymer containing a chain transfer functional group at its end as a polymer initiator.

13. The elastomer composition of claim 10, wherein said siloxane polymer containing a halogen atom at its end has an end structure represented by the general formula (2)

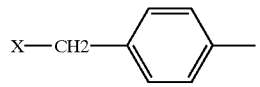

wherein X indicates chlorine, bromine or iodine.

14. The elastomer composition of claim 1, wherein said graft copolymer (b) is a graft copolymer of core-shell particles having an inner layer part (core) comprising a polymer component whose glass transition temperature is lower than 25° C. and an outer layer part (shell) comprising a polymer component whose glass transition temperature is at least 25° C.

15. The elastomer composition of claim 1, wherein said graft copolymer (b) is a graft copolymer of three-layered core-shell particles having a central part comprising a polymer component whose glass transition temperature is lower than 25° C., an interlayer part comprising a polymer component other than the component constituting the center part whose glass transition temperature is lower than 25° C., and an outer layer part comprising a polymer component whose glass transition temperature is at least 25° C.

16. The elastomer composition of claim 1, wherein said graft copolymer (b) is a graft copolymer comprising 30 to 95% by weight of a polymer component whose glass transition temperature is lower than 25° C. and 70 to 5% by weight of a polymer component whose glass transition temperature is at least 25° C.

17. The elastomer composition of claim 1, wherein said polymer component constituting said graft copolymer (b) and having glass transition temperature of lower than 25° C. is a polymer obtained by polymerizing a monomer comprising, as a main component, at least one selected from the group consisting of vinyl monomers and cyclic siloxanes and, wherein said polymer component constituting said graft copolymer (b) and having glass transition temperature of at least 25° C. is a polymer obtained by polymerizing a monomer comprising, as a main component, at least one selected from the group consisting of a (meth)acrylate ester, an aromatic alkenyl compound, a vinyl cyanide compound and halogen-containing unsaturated compound.

18. An impact modifier containing the elastomer composition of claim 1 as a main component.

19. A thermoplastic resin composition comprising 1 to 99% by weight of the elastomer composition of claim 1 and 99 to 1% by weight of a thermoplastic resin (c).

20. The thermoplastic resin composition of claim 19, wherein said thermoplastic resin is at least one selected from the group consisting of poly(vinyl chloride) resin, poly(methyl methacrylate) resin, acrylonitrile-styrene copolymer resin, methyl methacrylate-styrene copolymer resin, polycarbonate resin, polyester resin and polyamide resin.

* * * * *